June 1, 1937.  F. C. TRAUTVETTER  2,082,664
MILK STOOL
Filed April 3, 1936
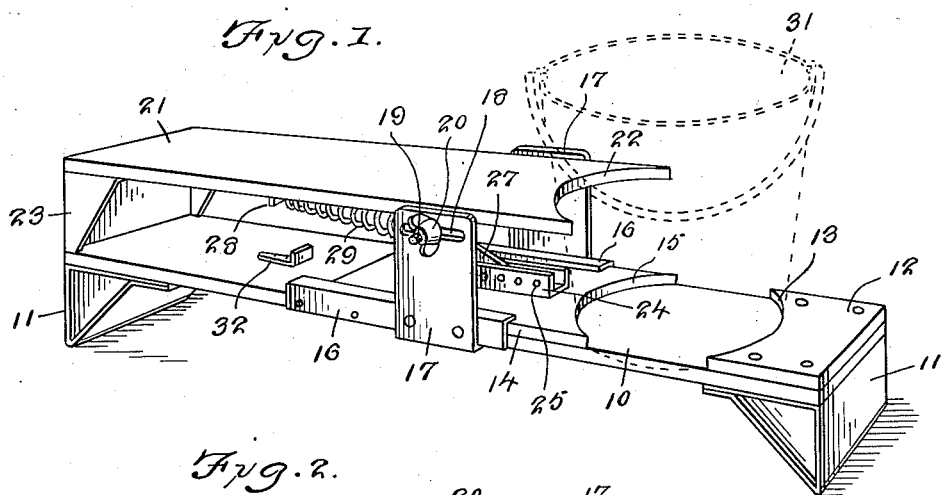
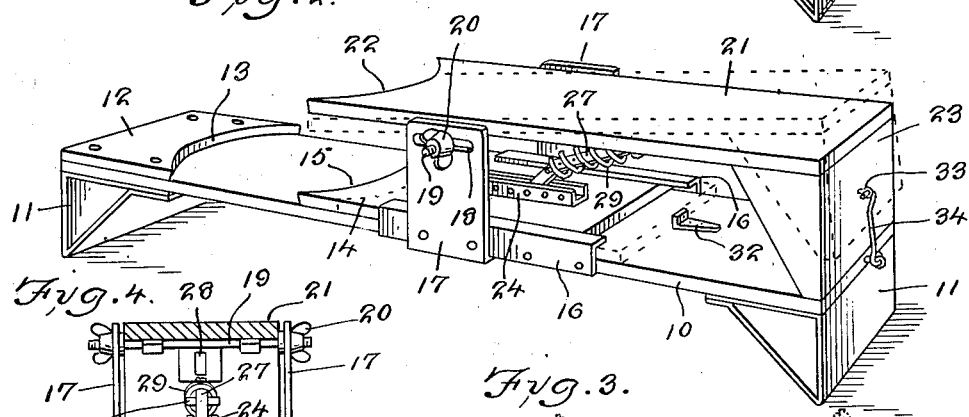
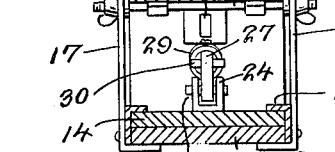
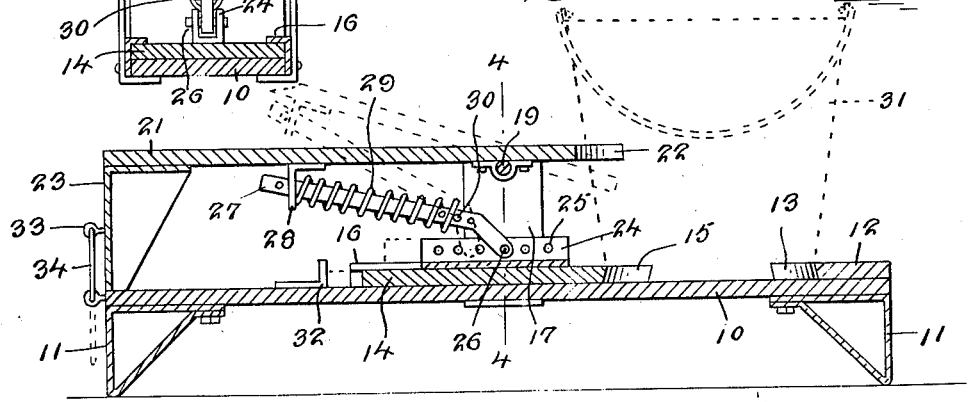
Fred C. Trautvetter
INVENTOR
BY Victor J. Evans & Co.
ATTORNEY Patented June 1, 1937

2,082,664

UNITED STATES PATENT OFFICE 2,082,664

MILK STOOL

Fred C. Trautvetter, Warsaw, Ill.

Application April 3, 1936, Serial No. 72,600

1 Claim. (Cl. 31—57)

The invention relates to a bench or stool and more especially to a practical sanitary and convenient milking stool.

The primary object of the invention is the provision of a stool of this character, wherein by its construction a milk pail, bucket or the like can be held firmly during the milking period so as to prevent the accidental tilting over of such pail, bucket or the like and thus having its contents become contaminated with the filth of the barn yard or having the pail upset and the milk therein lost.

Another object of the invention is the provision of a stool of this character, wherein an operator when seated upon the stool clamps the pail, bucket or the like in proper position and retains it there during the milking period because when the operator rises the weight relieved from the seat occupied by such operator will actuate a gripping jaw to free the pail, bucket or the like.

A further object of the invention is the provision of a stool of this character, wherein the same is novel in its entirety and is easily carried from one point to another, being compact, neat in appearance, lacking awkwardness and will positively clamp or hold the pail, bucket or the like during occupancy of such stool.

A still further object of the invention is the provision of a stool of this character, which is extremely simple in its construction, readily and easily adjusted to hold different sizes of pails, buckets or the like, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a perspective view of the stool constructed in accordance with the invention with the parts thereof in position for clamping a pail.

Figure 2 is a view similar to Figure 1 looking toward the other side of the stool.

Figure 3 is a vertical longitudinal sectional view through the stool.

Figure 4 is a sectional view on the line 4—4 of Figure 3.

Similar reference characters indicate corresponding parts throughout the several views in the drawing.

Referring to the drawing in detail, the stool comprises a stand 10 in the nature of a bench having supporting legs 11 at opposite ends thereof and built upon the bed of this stand at one end thereof is a stationary jaw 12, it having a curved work engaging edge 13 while slidably fitted upon said bed is a companion movable jaw 14, it having a curved work engaging edge 15 opposing the edge 13 of the stationary jaw 12. The movable jaw operates in guide tracks 16 made secure to opposite edges of the bed at the longer sides thereof.

Secured to the stand 10 intermediate its ends at opposite longer sides thereof are vertically disposed plate-like brackets 17, these having horizontally disposed slots 18 near their upper ends for accommodating an adjustable pintle 19 in the form of a bolt carrying a winged nut 20 and swingingly supported upon this pintle between the brackets is a seat section 21, it having a jaw end 22 and a prop end, the prop being indicated at 23. The prop 23 is adapted to come to rest upon the bed of the stand 10 when the seat section 21 is occupied.

The jaw end 22 is next to the jaw edge 15 of the movable jaw 14.

Mounted on the movable jaw 14 is a pivot rack 24 having suitable holes 25 for the selective engagement of a pivot 26 therein swingingly connecting a plunger rod 27 to the rack 24. This plunger rod loosely works through a guide eye 28 fixed to and depending from the seat section 21 while surrounding the said rod 27 is a coiled expansion spring 29, one end being at rest against the eye 28 and the other against an adjustable pin 30 mounted in the rod 27. Thus normally the seat section 21 is tilted and slants from a normal horizontal position. In this position the seat section 21 releases the movable jaw 14 from clamping coaction with the jaw 12 in holding a pail 31 upon the stand 10. Now when pressure is applied upon the seat section 21 the rod 27 forces the jaw 14 toward the jaw 12 so that a pail between these jaws when resting upon the bed of the stand 10 can be firmly clamped and held upon the stool while the seat section 21 is occupied so that there is no liability of the turning over of the pail during the milking period.

The jaw 14 is limited in its movement in one direction by a stop 32, that is, in a direction receding from the jaw 12.

The working of the stool will be automatic for the clamping and unclamping of a milk pail, bucket or the like and such clamping is effected by occupancy of the seat section 21 of the stool.

The prop 23 has thereon an eye 33, while the end of the base of the stand 10 next to said prop has fitted therewith a latching hook 34 for engaging said eye when the said seat section 21 has been lowered into a substantially horizontal position and thus fastening such seat section fixed.

What is claimed is:

A stool of the character described comprising a bench formed with a flat top providing a rest for a pail, guides fixed to opposite longer edges of the top, a stationary jaw on said top, a sliding jaw fitting said guides and movable toward and away from the stationary jaw, uprights carried by the bench and having transverse slots, a pivot engaged in said slots and adjustably secured in a fixed position, a rocking seat section carried by said pivot, a channeled rail fixed to the upper side of the slidable jaw and having spaced transverse holes, a pivot selectively engageable in said holes, an arm swingingly connected to the last named pivot, an eye depending from the seat section and loosely receiving said arm, a spring surrounding the arm and held fast thereto and working against the eye to tilt the seat section in one direction, and a jaw formed on the seat section.

FRED C. TRAUTVETTER.